United States Patent [19]

Bergmann et al.

[11] Patent Number: 4,607,557

[45] Date of Patent: Aug. 26, 1986

[54] PUNCH

[75] Inventors: Ewald Bergmann, Rechberghausen; Otto Kurz, Hattenhofen; Hans-Martin Dommer, Göppingen, all of Fed. Rep. of Germany

[73] Assignee: L. Schuler GmbH, Fed. Rep. of Germany

[21] Appl. No.: 643,105

[22] Filed: Aug. 22, 1984

Related U.S. Application Data

[63] Continuation of Ser. No. 502,350, Jun. 13, 1983, abandoned, which is a continuation of Ser. No. 49,042, Jun. 15, 1979, abandoned.

[30] Foreign Application Priority Data

Jun. 15, 1978 [DE] Fed. Rep. of Germany ....... 2826129
Apr. 21, 1979 [DE] Fed. Rep. of Germany ....... 2916174

[51] Int. Cl.$^4$ ............................................. B21D 28/14
[52] U.S. Cl. ....................................... 83/687; 83/689; 83/691

[56] References Cited

U.S. PATENT DOCUMENTS

| 407,242 | 7/1889 | Quinn | 83/691 |
|---|---|---|---|
| 806,362 | 12/1905 | Porter et al. | 83/267 |
| 843,875 | 2/1907 | Dunham | 83/682 |
| 1,767,492 | 6/1930 | Valentine | 83/687 |
| 1,788,023 | 1/1931 | Hochreiner | 83/682 |
| 3,273,438 | 9/1966 | Brook | 83/687 X |
| 3,500,710 | 3/1970 | Taber | 83/687 X |
| 3,524,370 | 8/1970 | Thompson | 83/682 X |

FOREIGN PATENT DOCUMENTS 473621 7/1969 Switzerland ......................... 83/683

Primary Examiner—Frank T. Yost
Attorney, Agent, or Firm—Craig and Burns

[57] ABSTRACT

A punch which includes a notching tool and a separating which are adapted to punch at least one notch and a separating gap in each effective working stroke of the punch. A separating tool is formed by at least two independently disposed separating punches which are spaced from each other by a distance which is equal to or greater than a width of a web formed between two punched notches. Likewise, the notching tool may be in the form of two independent spaced notching punches.

5 Claims, 4 Drawing Figures

PUNCH

This is a continuation of application Ser No. 502,350, filed June 13, 1983, now abandoned, which is a continuation of applicaation Ser. No. 049,042 filed June 15, 1979, now abandoned.

The present invention relates to a notching arrangement and, more particularly, to a punch provided with a notching tool and a separating tool by which a notch such as, for example, a notch in a stator lamination, and a separating gap are punched in every effective work stroke of the punch.

In German Offenlegungsschrift No. 21 22 424, a punch is proposed which includes a notching tool and a separating tool with the separating tool having a separating punch which includes a cutting edge extending over a distance which is slightly more than a width of a web provided between adjacent notches. By means of this proposed punch, a notch is punched with each effective working stroke and the notched stator lamination section is separated out of a round sheet.

Difficulties encountered in notching stator laminations with a punch of the aforementioned type reside in the fact that, with an automatic punching machine such as disclosed, for example, in German Pat. No. 1,602,574, in the punching of the last, next to the last or third from the last notch, the web or webs between the respective notches no longer provide a sufficient rigidity so that, with an ordinary inner centering of electric motor laminations, in spite of excellent centering of the stator lamination that is to be separated, there may occur defects or faults in the division or separation of the rotor lamination from the stator lamination as a result of high acceleration, inadequate stiffness or rigidity in the remaining web or webs and the relatively great mass in cases of a rather large electric motor lamination and the consequent torsion of the webs. These difficulties occur to an unacceptable degree when a space or air gap is simultaneously punched in the lamination by a separating punch between the stator and rotor laminations for, in such situations, the supporting action between the stator and rotor laminations that are separated without waste is entirely lost.

To overcome the above-noted difficulties, it has been proposed, for example, in a prospectus entitled *Automatic Notching Machine*, Maschinenfabrik Weingarten, 1968 (FIGS. 15, 16), to punch or notch the respective laminations by means of a notching arrangement which include a workpiece receiver with an external centering and an external toothed rim by which the workpiece receiver is driven. A disadvantage of such proposed arrangement resides in the fact that with such a notching arrangement with so-called "ring drives" considerable difficulty is encountered in attempting to automate the punching or notching operation. Moreover, no tools with column guides can be used and the notching arrangement has to be driven more slowly with "ring drives" because the masses that have to be accelerated or slowed down are substantially greater than in an arrangement with an internal centering of the laminations.

With electrical apparatus such as electric motors employing laminations having a relatively large diameter, ordinary clamping and inner centering of the laminations in punching final notches in the stator laminations have been ineffective in avoiding defective separation of the rotor lamination from the stator lamination.

The aim underlying the present invention essentially resides in providing a notching arrangement wherein a punching or notching of the last notch in a lamination avoids the possibility of a defective or faulty division or separation of the rotor lamination from the stator lamination.

In accordance with the present invention, a punching or notching arrangement is provided wherein just prior to severance of rotor and stator lamination there is at least one more web or portion of a web that is to be separated than there are notches to be punched so as to maintain a connection between the stator lamination and rotor lamination.

In accordance with the present invention, a notching tool for notching, for example, notching stator laminations, is also provided with a separating tool which is constructed with two independently disposed separating punches which are spaced from each other by a distance which is equal to or greater than a width of a web between two adjacent notches.

Advantageously, according to the present invention, each separating punch is provided with a cutting edge that extends over a distance which is at least slightly greater than a half of a width of a web between adjacent notches.

Additionally, it is also possible in accordance with the present invention to provide the separating punches with a cutting edge which extends over slightly more than one whole width of a web between adjacent notches by elongating the cutting edges of the separating punches and grinding the cutting edges back toward the notching tool.

In accordance with further advantageous features of the present invention, a notching or punching tool is provided which includes at least two notching punches and a pair of separating punches which are arranged so that a distance between adjacent edges of the separating punches is a whole number multiple of an indexing step of the laminations with the whole effective cutting length of the separating punches corresponding to an indexing step increased by an overcut.

Advantageously, in accordance with the present invention, the zone of the overcut of the separating punches is in the zones of the punched notches.

Accordingly, it is an object of the present invention to provide a punching tool for punching laminations of an electrical apparatus which insures the existence of substantially greater stability between a stator lamination and a rotor lamination during a punching operation.

Another object of the present invention resides in providing a punch arrangement by which an especially favorable effect is obtained if together with the notching of the stator lamination an air gap or space is punched during a separating of division of the rotor lamination, particularly if the rotor lamination is to be notched at a slant.

A still further object of the present invention resides in providing a punch arrangement which allows for greater production of laminations for electrical apparatus by the provision of at least two notching punches.

A still further object of the present invention resides in providing a punch arrangement which enables a reduction of a dividing or indexing step of the laminations by providing an increase in a number of punched notches per effective working stroke of the punch.

These and other objects, features, and advantages of the present invention will become more apparent from the following description when taken in connection with the accompanying drawings which show, for the purpose of illustration only, two embodiments in accordance with the present invention, and wherein.

Figure 1:
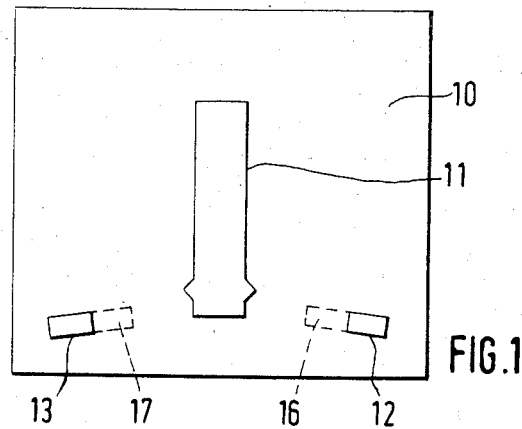
FIG. 1 is a partially schematic view of a punch construction in accordance with the present invention.

Referring now to the drawings wherein like reference numerals are used throughout the various views to designate like parts, and more particularly, to FIG. 1, according to this figure, a punch 10 includes a notching tool 11 and a separating tool formed by two separating punches 12, 13. The notching tool may be employed to provide notches in, for example, a stator lamination for electrical machine with the separating punches 12, 13 serving to separate the stator lamination from a rotor lamination upon indexing and driving of the punch by mechanism 1 of known construction in a manner more fully described hereinbelow.

Figure 2:
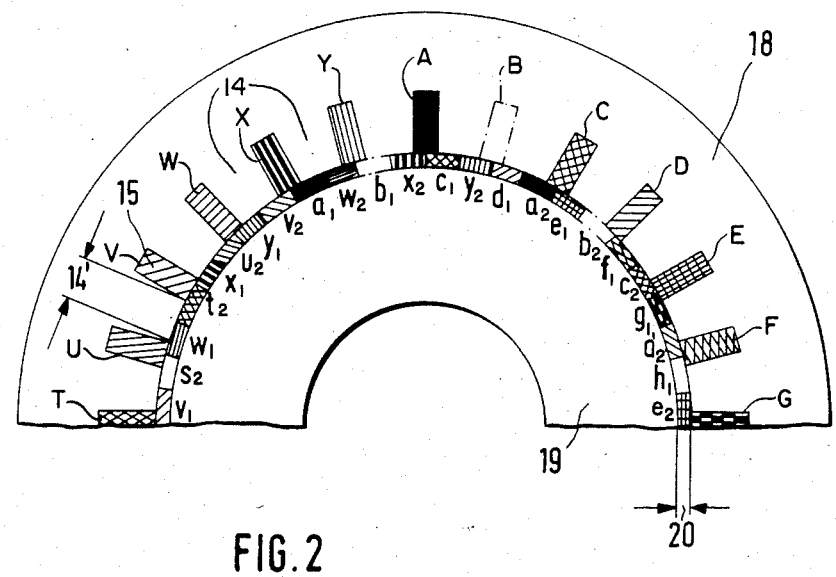
FIG. 2 is a top plan view of a notched lamination punched with the tool of FIG. 1.

As shown in FIG. 2, a web 14 is provided between adjacent notches produced by the notching tool 11. The two separating punches 12, 13 each have a cutting edge which has a length that is slightly greater than one half of a width 14' of the web 14. In the illustrated embodiment, the two separating punches 12, 13 are separated from each other by a distance which is three times the width 14' of the web 14.

As also shown in FIG. 1, the cutting edges of the separating punch may also be extended in a ground-back form as cutting edges 16, 17 so that the total length of the cutting edges 16, 17 would be equal to slightly more than one width 14' of the web 14.

FIG. 2 provides an illustration of one half of a notched stator lamination 18 and a separated un-notched rotor lamination 19. With cutting edges of the separating punches 12, 13 extending slightly more than half of a width 14' of a web 14, the stator laminations 18 and rotor laminations 19 would be processed in the following manner. Assuming the processing of the laminations begins at the notch designated A, upon the first working stroke of the punch 10, the notch A as well as notches $a_1$, $a_2$ having a circumferential length slightly larger than half of the width 14' of the web 14 are punched in the stator lamination 18 by the notching tool and separating punches 12, 13. The punching of the notches $a_1$, $a_2$ results in the formation of a space or air gap 20. Following the first notching, the lamiation 18, 19 is sequentially indexed in a conventional manner and the punch 10 is once again operated so as to result in subsequent punching of the notches B–Y and associated notches $b_1$, $b_2$–$y_1$, $y_2$.

As can be seen from FIG. 2, by virtue of the spacing between the separating punches 12, 13, beginning with the fourth notch D, the associated notch $d_1$ results in the remaining half web width being punched. Thus, for example, upon punching the notch D, the entire width 14' of the web 14 between the notches B, C is punched and, upon punching the notch E, the associated notch $e_1$ and previously punched notch $b_2$ removes the entire width 14' of the web 14 between the notches C, D and so on with separation of the stator lamination 18 from the rotor lamination 19 being accomplished by a complete removal of the webs to form the gap or space 20.

By starting at the notch A, as shown in FIG. 2, with the subsequent punching of, for example, notches B–E and associated notches $b_1$, $b_2$–$e_1$, $e_2$, a half web width portion remains between the notches A, B. Thus, the punching of the last three notches W, X, Y, will now be considered.

At the time the notches W, X, Y are punched, the notches $s_2$, $t_2$, and $u_2$ will have been punched by virtue of the fact that the corresponding notches 15 will have been punched in the stator lamination 18. Consequently, at this time in the processing step, the stator lamination 18 and rotor lamination 19 will still be connected by six half web widths at which the notches $w_1$, $w_2$, $x_1$, $x_2$, and $y_1$, $y_2$ will be punched. Upon the punching of the notch W, the notches $w_1$, $w_2$ will be punched whereby only four half web widths remain, and, with punching of the notches X, $x_1$, $x_2$, there still remains two half web widths for the final punching step. It is clear that hereby the rigidity of the connection between the stator lamination 18 and rotor lamination 19 will be substantially increased as opposed to only one remaining web width whereby any defects in the division or separation of the stator lamination 18 from the rotor lamination 19 as a result of the last punching operation will be avoided. With the last notch Y, the notches $y_1$, $y_2$ that are spaced apart by three widths 14' of the web 14 will be punched so that the stator lamination 18 and rotor lamination 19 may be reliably separated.

With a punch 10 equipped with the separating punches 12, 13 provided with the elongated cutting edges 16, 17 and with the punches 12, 13 being ground back toward the notching tool 11, one intermittent operation is equivalent to the process described hereinabove with this intermittent operation being characterized in that the separating punches 12, 13 are intermittently out of active engagement while the notching tool 11 remains in an active engagement. Instead of the intermittent operation, it is also possible to provide a control means for the punch 10 thereby achieving the same results.

Figure 3:
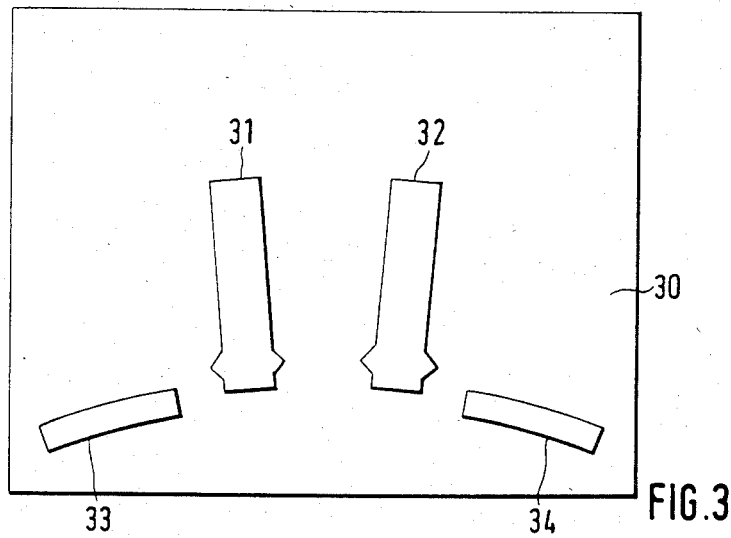
FIG. 3 is a partially schematic view of another embodiment of a punch construction in accordance with the present invention.

As shown in FIG. 3, a punch 30 may be provided which includes two notching punches 31, 32 as well as two separating punches 33, 34. The distance between adjacent edges of the punches 33, 34 correspond to a whole number multiple which, in the illustrated embodiment, corresponds to twice the distance of an indexing of the lamination with the whole effective cutting length of the separating punches 33, 34 corresponding to an indexing step of the lamination plus a slight amount for an overcut with such cutting length being divided or halved between the respective separating punches 33, 34. The area over the overcut, that is, the area in which the cut of the separating punches 33, 34 opens into the following cut of the separating punches 33, 34 lies in a middle zone of the web 36 between adjacent notches 35, so that a connection remains which promotes stability between an un-notched rotor sheet 37 and two webs 36 of a notched stator sheet 38.

Figure 4:
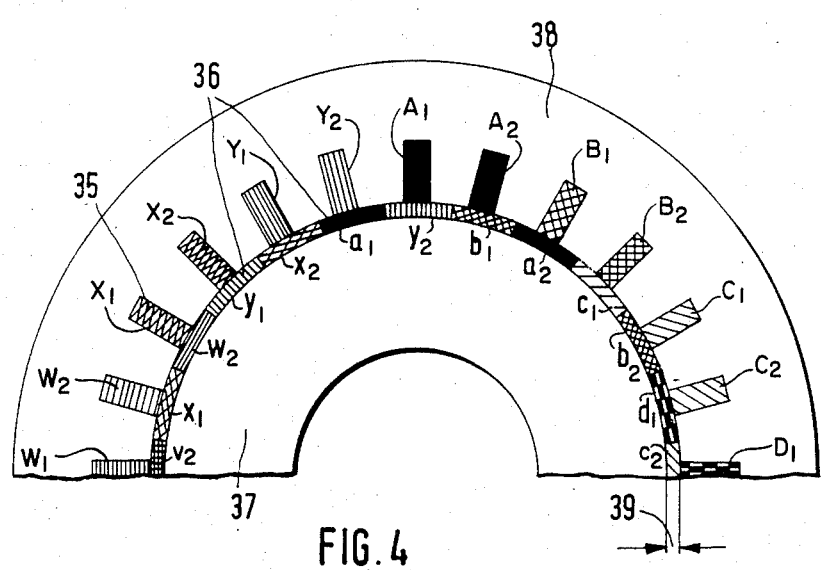
FIG. 4 is a top plan view of a notched lamination punched with the punch construction of FIG. 3.

FIG. 4 provides an illustration of one half of a notched stator lamination 38 and un-notched rotor lamination 37 and also provides an illustration of the manner in which the punch 30 along with notching punches 31, 32 and separating punches 33, 34 process the respective laminations 37, 38.

Assuming the processing of the laminations 37, 38 begins with the notches designated $A_1$, $A_2$ with the first working stroke of the punch 30, the two notches $A_1$, $A_2$ as well as the notches $a_1$, $a_2$ are punched in the lamination by the notching punches 31, 32 and two separating punches 33, 34. The laminations 37, 38 are then indexed or advanced one step in a conventional manner and the notches $B_1$, $B_2$ as well as notches $b_1$, $b_2$ are punched. After the third indexing of the lamination and upon punching of notches $C_1$, $C_2$ and $c_1$, $c_2$, the separation of the rotor lamination 37 from the stator lamination 38 is completed from the notch $a_1$, $c_1$ so as to form a space or air gap 39 with only the web area for accommodating the notch $y_2$ connecting the rotor laminations 37 and stator laminations 38 in the area of the notch $A_1$ between the notches $a_1$, $b_1$.

In the final stages of the punching process, the notches $W_1$, $W_2$, $X_1$, $X_2$, $Y_1$, $Y_2$ are punched. Upon the punching of the notches $W_1$, $W_2$, the notch $w_2$ is punched. In the next to the last punching, the notches $X_1$, $X_2$ along with the notches $x_1$, $x_2$ are punched thereby leaving the area for accommodating the notches $Y_1$, $Y_2$ and $y_1$, $y_2$. As can be appreciated, the rigidity of the connection, by the arrangement of the separating punches 33, 34, is enhanced so that thereby defects in separation or division of the rotor lamination 37 from the stator lamination 38 in the punching of the last notches $Y_1$, $Y_2$ and $y_1$, $y_2$, from shifting of the stator lamination 38 with respect to the rotor lamination 37 during the final processing step is avoided. With the last notches $Y_1$, $Y_2$ and $y_1$, $y_2$ that are separated from each other by two advanced steps are punched, stator lamination 38 is reliably separated from the rotor lamination 37.

If the overcuts of the separating punches 33, 34 are in the zone of the notches 35, there is an acceptable space or air gap produced without any recognizable tail from the punches 33, 34 on the finished stator sheet 38.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. Disposed upon a punch, a punching tool with respect to which a workpiece sheet is to be indexed, at each effective working stroke, to steps along an arc to punch said sheet to be separated into rotor and stator blanks for the manufacture of slotted laminations for electrical machines, comprising notching tool means for punching at each effective working stroke at least one stator winding slot disposed along an arc of a circle and separating punch means for punching at each effective working stroke slots to comprise a circular air gap to separate a rotor blank and a stator blank, the separating punch means comprising two punch means disposed on said punch along an arc defining the circular air gap to be punched and spaced from each other by a distance to generate partially punched rotor and stator blanks joined at plural locations for substantially positionally stabilizing the rotor and stator blanks during successive effective working strokes.

2. A punch according to claim 1, wherein each separating punch means includes a cutting edge having a length which is at least slightly greater than one half of a width of a web between two adjacent punched stator winding slots measured along the arc defining the circular air gap.

3. A punch according to claim 1, wherein each separating punch means includes a cutting edge having a length which is slightly greater than a width of a web between two adjacent punched stator winding slots measured along the arc defining the circular air gap, and each separating punch means is ground back in a direction toward the notching tool means.

4. A punch according to claim 1, wherein the distance between the separating punch means is greater than a width between two adjacent winding slots in the workpiece, this distance and width being measured along an arc of the circular air gap.

5. Disposed upon a punch, a punching tool with respect to which a workpiece sheet is to be indexed, at each effective working stroke, to steps along an arc to punch said sheet to be separated into a rotor lamination and stator lamination having N winding slots for electrical machines, comprising notching tool means for punching at each effective working stroke two stator winding slots disposed along an arc of a circle and separating punch means for punching at each effective working stroke slots to comprise a circular air gap to separate a rotor blank and a stator blank the separating punch means comprising at least two punch means disposed on said punch along an arc of said circle to define the air gap to be punched and spaced from each other by a distance, the magnitude of which is greater than a web width between two adjacent punched stator winding slots measured along said arc of said circle, for generating partially punched rotor and stator blanks joined at plural locations for positionally stabilizing the rotor and stator blanks during all successive effective working strokes prior to punching the Nth winding slot.

* * * * *